Patented Apr. 6, 1926.

1,579,607

UNITED STATES PATENT OFFICE.

RALPH A. HALLORAN, OF BERKELEY, WILLIAM N. DAVIS, OF OAKLAND, AND GEORGE A. DAVIDSON, OF SAN FRANCISCO, CALIFORNIA, ASSIGNORS TO STANDARD OIL COMPANY, OF SAN FRANCISCO, CALIFORNIA, A CORPORATION OF CALIFORNIA.

TREATMENT OF WASTE PRODUCTS RESULTING FROM ACID TREATMENT OF PETROLEUM OIL.

No Drawing. Application filed September 6, 1923. Serial No. 661,323.

*To all whom it may concern:*

Be it known that we, RALPH A. HALLORAN, residing at Berkeley, Alameda County, State of California, WILLIAM N. DAVIS, residing at Oakland, Alameda County, State of California, and GEORGE A. DAVIDSON, residing in the city and county of San Francisco, State of California, citizens of the United States of America, have invented certain Improvements in the Treatment of Waste Products Resulting from Acid Treatment of Petroleum Oil, of which the following is a specification.

Petroleum oils or distillates contain more or less of those constituents known as unsaturated, aromatic, and more or less undesirable compounds. These materials are commonly removed, either partly or entirely, in the refining of such oils for various purposes. In the refining process such oils are treated with sulphuric acid ranging in strength from approximately 66° Baumé acid to fuming acid, and the unsaturated, aromatic, and more or less undesirable materials combine with the sulphuric acid, producing compounds which settle out from the treated oil in the form of a tarry sludge. This acid sludge contains not only the products of reaction, but includes a percentage of uncombined acid.

Ordinarily such acid treatment is effected by more than one application of acid to the oil. To complete the settling out or precipitation from the oil of the products of reaction, it is customary, after the last application of acid to the oil and after the removal of the acid sludge produced by the previous applications of acid, to add water to the oil and wash it with the same in the presence of the products of the reaction and such quantities of acid which may exist in the oil. This washing of such oil with water causes the reaction products and uncombined acid, which would otherwise tend to remain suspended in the oil, to collect or gather together and settle out of the oil. When, therefore, the treated oil is removed, there remains a weak acid in which there are intermingled the reaction products thus separated from the oil. Due to the character and degree of treatment, and to the reaction with the water at the relatively low temperature employed, the reaction products in such weak acid are those most difficult to hydrolyze. Such weak acid so contaminated by such reaction products we herein term a "dirty acid."

Another source of such a dirty weak acid is the combined acid sludge produced by the treatment of oils with fuming or highly concentrated acid where this acid sludge is subjected to the ordinary steam operation to recover some of the acid and produce a tar. The acid thus separated out is a weak and dirty acid, substantially similar to the first dirty acid described, in that it contains material quantities of the products of the reaction and such products are in a state more difficult to hydrolyze than the ordinary combined acid sludge.

This dirty weak acid has heretofore been a nuisance and loss about a refinery, as ordinary methods of purification and concentration have been found either ineffectual or not economical.

An ordinary example of such a dirty weak acid, i. e.—a solution of the more complex organic matter in weak sulphuric acid—has approximately the following proportions by weight:—60% $H_2SO_4$, 35% water, and approximately 5% of reaction products capable of being separated into 2% of sulphuric acid ($H_2SO_4$) and 3% of tar or organic matter. The percentages given are relative and approximate.

By the term "weak acid", as herein used, we refer to acid having a strength of less than 90 per cent.

An object of this invention is to provide a process by which this waste product may be recovered as a valuable and useful product. First, that the sulfuric acid content of such dirty acid may be recovered in such form as to be readily concentrated into acid of strength for use in further acid treatment operation, and second, that reaction products contained in such dirty acid may be available for use as fuel, etc.

As an illustration of a process embodying the several features of our invention, the dirty acid is confined in a retort and brought to a temperature between 300° F. and 375° F., either by external heat or by the injection of steam, preferably the latter. The water content of such dirty acid should be sufficient to dilute the sulfuric acid produced by the process to a specific gravity of approximately 1,526 (52° Bé.). When the temperature of the dirty acid reaches the hydrolizing temperature, the hydrolizing reaction will be found to be very rapid and it will not be necessary to maintain the mixture at such temperature for an extended period of time. In raising the dirty acid to the required temperature, the retort is kept closed to maintain a pressure therein of over 50 pounds gage per square inch. The mass, having reached the hydrolyzing temperature, will separate into relatively weak, substantially clean acid and a liquid residual. If the water content of such dirty acid is sufficiently low to produce a substantially clean acid of more than 50° Bé. concentration, the tendency may be to form the products of reaction thus separated therefrom into a quite hard coking substance. When it is the desire of the operator to produce a liquid fuel or when it is desired to minimize this tendency to coking and produce such residuum in such condition as to be readily withdrawable from the retort, a small quantity of acid sludge or fuel oil may be mixed with the dirty acid before it is hydrolyzed.

We have thus found that, instead of such dirty acid being a mere waste product and a consequent nuisance which must be disposed of at a loss, it is possible, by so hydrolyzing the same, to recover the acid content thereof and to render available for fuel purposes the reaction products with which it is contaminated. We are thus able to recover what has heretofore been a very considerable loss in refining operations. As the treated material is maintained in the retort at a temperature from 300° F. to 375° F., while the separation takes place into relatively weak clean acid and the residuum, we are also able to withdraw or discharge from the retort the dilute clean acid thus produced and so heated to this temperature. By discharging this heated weak acid into a suitable vaporizing tower or chamber provided with baffles or other suitable spreading devices, the residual heat in this weak acid can be anvantageously employed for a further concentration of the acid, by thus vaporizing and withdrawing a part of the water content thereof. We are thus able to effect several degrees of concentration of the acid produced. It is obvious that this step of concentration is not confined to any particular form of apparatus.

Various modifications in the details of the process may be made without departing from the invention as covered by the appended claims. Reference is made to our copending application Serial No. 661,322, filed September 6, 1923, wherein certain features of the process not specifically claimed herein are therein claimed. The term "dirty acid" as employed in the appended claims is not intended to cover merely sludge acid recovered from the treatment of oil by oleum, but is employed to designate the particular solutions of tar in weak sulfuric acid derived from washing or gathering suspended sludge from oil, or derived by the decomposition of acid sludge with water such as is effected by the ordinary steam operation.

We claim:

1. The treatment of dirty acid derived in the acid treatment of petroleum oils, which consists in subjecting such dirty acid in a closed retort to a pressure of over 50 pounds gage per square inch, while raising the same to the high hydrolyzing temperature, thereby separating the same into relatively weak clear acid and a tarry residue, and withdrawing these products separately.

2. The process of treating dirty weak acid derived in the treatment of petroleum oils with sulfuric acid, which consists in subjecting the same, intermingled with fuel oil in a relatively small quantity, in a closed retort wherein a pressure of over 50 pounds gage per square inch is maintained, to a high hydrolyzing temperature, whereby the mass is separated into a relatively weak clean acid and a liquid fuel, and separately withdrawing said products.

3. The treatment of dirty acid derived in the acid treatment of petroleum oils, which consists in subjecting such dirty acid in a closed retort to a pressure of over 50 pounds gage per square inch, while raising the same to the high hydrolyzing temperature, thereby separating the same into relatively weak clean acid and a tarry residue, withdrawing the hot weak acid and partially concentrating the same by evaporation of the residual heat thereof.

4. The process of treating dirty acid derived in the treatment of petroleum oils with sulphuric acid, which consists in subjecting the same, intermingled with a material adapted to provide a solvent for the tar liberated from the dirty acid, in a closed retort wherein a pressure is maintained, to a high hydrolyzing temperature, where the mass is separated into a relatively weak and clean acid and a liquid fuel, and separately withdrawing said products.

5. A process of treating a weak acid containing a relative small amount of reaction products formed through the action of sulphuric acid upon petroleum oil, which acid reaction products are difficult to hydrolyze, which process includes subjecting such acid in a closed retort to a pressure of over 50 lbs. per square inch, while raising the same to the high hydrolyzing temperature of such acid reaction products, thereby separating the weak acid into relatively weak clean acid and a tarry residue, and separately withdrawing said products.

6. A process as in claim 5 in which fuel oil is passed into the retort in order to prevent coking of the tarry residue produced.

Signed at Richmond, California, this 1st day of September, 1923.

RALPH A. HALLORAN.
WILLIAM N. DAVIS.
GEORGE A. DAVIDSON.